UNITED STATES PATENT OFFICE.

ALEXANDER AUGUST ROSENBERG, OF FELLIN, LIVONIA, RUSSIA, ASSIGNOR OF PART OF HIS RIGHT TO OLGA KONSTANTINOVNA HOBERG AND VLADIMIR VASSILIEVITCH ZOUBKOFF, BOTH OF ST. PETERSBURG, RUSSIA.

INCRUSTATION-PREVENTIVE.

SPECIFICATION forming part of Letters Patent No. 305,336, dated September 16, 1884.

Application filed August 28, 1883. (No specimens.) Patented in Belgium July 6, 1883, No. 61,951; in France July 6, 1883, No. 156,431; in England July 9, 1883, No. 3,395; in Spain November 7, 1883, No. 3,487; in Russia December 28, 1883, No. 10,109, and in Italy December 31, 1883, XXXII, 118.

*To all whom it may concern:*

Be it known that I, ALEXANDER AUGUST ROSENBERG, of Fellin, in the Empire of Russia, have invented a new and useful Improvement in Compositions for Preventing Incrustations in Boilers, of which the following is a specification.

The invention has for its object a new composition for preventing incrustation in steam-boilers of any kind. This new composition consists in a mixture of raw, not peeled, potatoes, sweet peeled chestnuts, and common mashed or soaked peas. The best results are obtained by taking one hundred (100) kilograms of potatoes, about one (1) kilogram of chestnuts, and one (1) kilogram of peas; or, more precise, one hundred (100) kilograms of potatoes, 1.04166 kilogram of chestnuts, and 1.04166 kilogram of peas, (i. e., one hundred Russian pounds of potatoes, one hundred zolotniks of chestnuts, and one hundred zolotniks of peas.) This proportion may, naturally, vary in a small degree without interfering with the nature of the invention.

The quantity of the composition required for a given quantity of water depends on the proportion of lime and magnesia salts and of inorganic substances contained in the water, and may be easily ascertained by experiment.

In employing the described composition all impurities of the water settle down in the boiler in the form of mud, and thus incrustation is prevented. Trials have shown that in employing this new composition for some considerable time even incrustations already existing in boilers were removed.

I am aware that starch has been heretofore used to prevent incrustation, as also have chestnuts and potatoes. I therefore do not claim these ingredients generally or separately; but

What I claim as novel, and desire to secure by Letters Patent of the United States, is—

The above-described composition for preventing incrustation in steam-boilers, said composition consisting of a mixture of raw potatoes, sweet peeled chestnuts, and common washed or soaked peas, substantially in the proportions set forth.

In testimony whereof I have signed my name to this specification in the presence of two subscribing witnesses.

ALEXANDER AUGUST ROSENBERG.

Witnesses:
   NICHOLAS TSCHEKALOFF,
   JULIUS THERLING.